United States Patent [19]

Joel, Jr.

[11] 4,178,474

[45] Dec. 11, 1979

[54] SIGNALING SYSTEM

[75] Inventor: Amos E. Joel, Jr., New York, N.Y.

[73] Assignee: Bell Telephone Laboratories, Incorporated, Murray Hill, N.J.

[21] Appl. No.: 592,959

[22] Filed: May 10, 1945

[51] Int. Cl.² .............................................. H04L 9/04
[52] U.S. Cl. .................................. 179/1.5 R; 178/22; 331/78
[58] Field of Search ............... 179/1.5, 15 PT, 1.5 R; 250/27 GT, 27 CC, 27 PS; 178/22; 331/78

[56] References Cited

U.S. PATENT DOCUMENTS

3,968,454  7/1976  Busch ..................................... 178/22
3,983,326  9/1976  Gannett ................................. 178/22

Primary Examiner—Howard A. Birmiel
Attorney, Agent, or Firm—H. A. Burgess

EXEMPLARY CLAIM

6. In a key pulse system for generating key pulses of definite length and highly irregular magnitude with intervening spaces, cyclically operating devices for generating groups of irregular sequences of pulses at a rate much higher than the rate of occurrence of said key pulses, each such group of pulses existing for the length of one of said spaces, and means to determine the magnitude of the next key pulse from the last pulse in the group of pulses occupying the preceding space.

18 Claims, 9 Drawing Figures

SIGNALING SYSTEM

The present invention relates to a pulse producing system and circuits and apparatus appurtenant thereto. The invention will be disclosed in the form of a key generating system for producing output currents varying with time in a highly irregular manner, approaching a fortuitous manner, but at the same time in a reproducible manner so that duplicate systems at separated points can generate identical output currents suitable for use in enciphering and deciphering signals.

The invention is adapted for use in association with known types of secret signal transmission systems in which a secret key current or wave is used at the transmitting station to encipher signals for transmission and a duplicate key is used at a receiving point for deciphering the secretly transmitted signals.

An object of the invention is to provide for the generation of a key having a very long cycle and capable of manual modifications within the system so that periodical changes can readily be made in the key generating system such as once a day or at other suitable periods.

One feature of the invention relates to the generation of key-controlling pulses at a high rate of speed and sampling these pulses at intervals to determine the key pulse for each key pulse interval.

Other and more specific objects and features relate to auxiliary or component functions and parts for contributing to the key production, including a voltage discriminating circuit which is believed to be novel and capable of general use, and a special reentry circuit cooperating with the voltage discriminating circuit, as well as other features that will appear as the description proceeds.

The nature and objects of the invention will be more fully understood from the following detailed description in connection with the drawings in which:

FIG. 1 is a block schematic diagram showing how the key generating circuit in accordance with the invention may be used in a known type of privacy system to be referred to;

FIG. 2 is a block schematic diagram showing how the various elements of the key generating system according to the invention are related and function with respect to one another.

Figures 1, 2, 9:
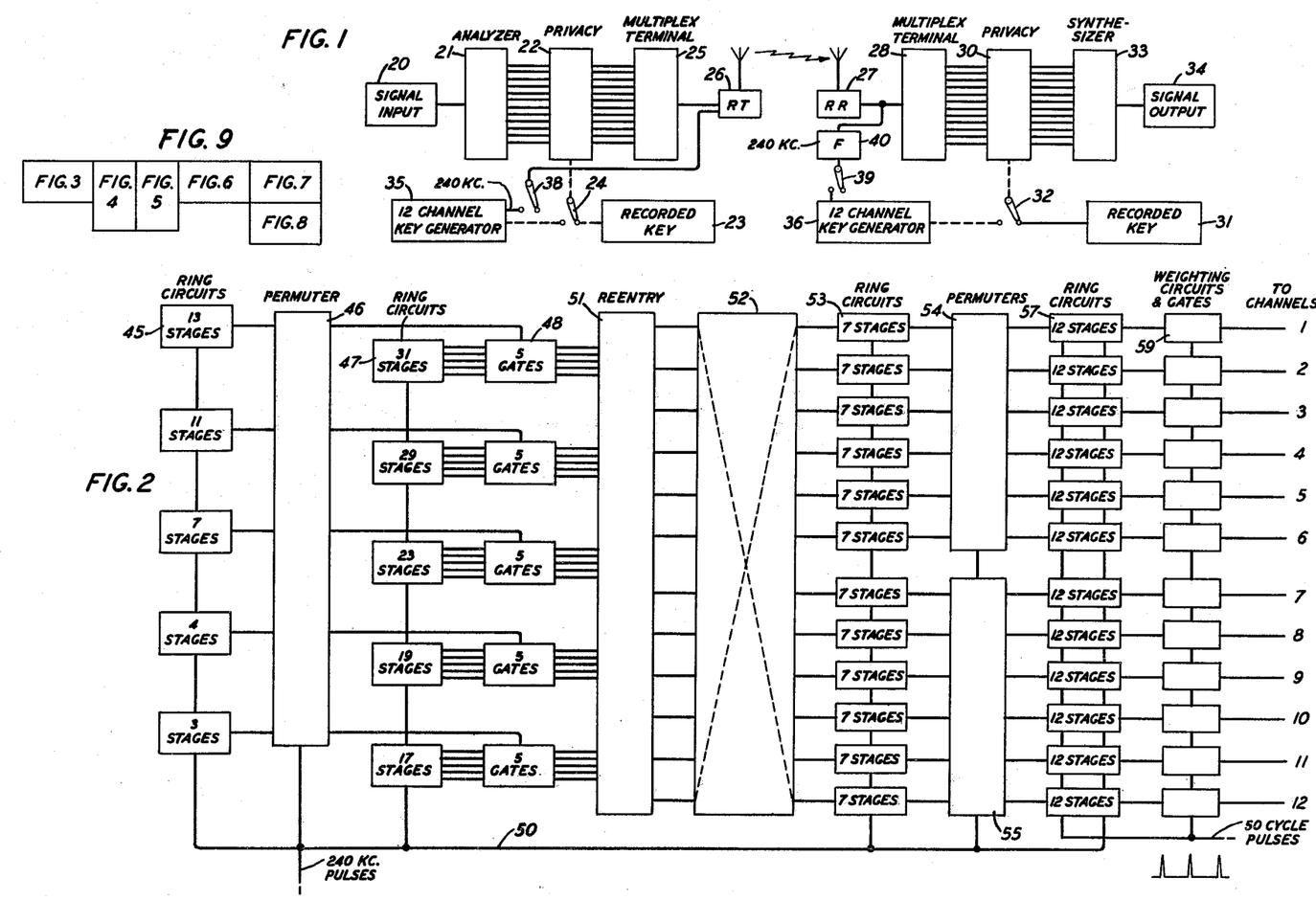

A known type of telephone privacy system is indicated in FIG. 1 and may be in accordance with the Lundstrom-Schimpf application Ser. No. 456,322, filed Aug. 27, 1942 in which the transmitting station is shown at the left in the figure and the receiving station at the right. The speech or other input circuit 20 is connected to a vocoder analyzer 21 for deriving from the speech signal in twelve separate paths or channels a series of low frequency speech-defining waves in accordance with the general principles disclosed in H. W. Dudley U.S. Pat. No. 2,151,091, granted Mar. 21, 1939. One or more of these channels is a pitch-defining channel and the remainder are spectrum-defining channels. A privacy system indicated by the box 22 provides for separately enciphering the currents in each of these twelve channels in accordance with an individual secret key which in the Lundstrom-Schimpf diclosure is derived as a recorded key from a phonograph record in suitable circuits indicated by the box 23. The dashed line shown leading through the switch 24 to the box 23 is assumed to comprise twelve separate leads or circuits. After the currents in the twelve individual vocoder channels have been enciphered in this manner they are sent into the multiplex terminal circuit 25 where they each modulate a carrier wave of different frequency so that they may be sent over a single path in accordance with the principles of multiplex carrier transmission. For example, they may be impressed upon a common radio transmitter circuit 26 for transmission to the distant radio receiving circuit 27. The multiplex terminal 28 contains filters and other suitable apparatus for separating the currents into twelve individual vocoder channels which lead into the privacy 30. This privacy system receives duplicate key waves from 31 by way of switch 32 which is assumed to comprise twelve separate circuits or paths. After decipherment in the privacy 30 the recovered low frequency speech-defining waves are sent into the synthesizer 33 where they are used to reconstruct the original speech or signal message in accordance with the principles of the Dudley patent disclosure and the resulting signal is reproduced in the signal output circuit 34.

The present invention is concerned with the generation of key waves which may be substituted for the recorded key waves in a system of the type shown by Ludstrom and Schimpf. FIG. 1 illustrates how the key generator of the present invention may be substituted in this type of system by throwing the switches 24 and 32 to their alternate positions so that in the transmitting station the key pulses from the alternate key generator 35 are sent into the privacy 22 and identical key pulses generated at 36 are sent into the privacy 30. Auxiliary switches 38 at the transmitter and 39 at the receiver are shown which may also in some cases at least be provided. These are actuated toward their left or closed position when switching from the recorded key to the key generator in accordance with this invention. Switch 38 allows some of the 240-kilocycle wave used in the key generator 35 to be impressed on the radio transmitter 26 for transmission to the distant station for synchronizing purposes. This wave is selected from the radio receiver output by means of filter 40 and sent through switch 39 into key generator 36 for maintaining synchronism between the two key generators 35 and 36.

As in the case of the Lundstrom-Schimpf disclosure, it will be assumed that the key generator in accordance with the invention produces pulses varying in steps and having six possible step values designated 0, 1, 2, 3, 4 and 5 in each of the twelve key output circuits and that the pulses vary independently of each other in the different channels and have a substantially random order of occurrence of step values. For the sake of illustration it will be assumed that the pulses are of about 18 milliseconds duration with 2 milliseconds spacing between pulses.

Referring to FIG. 2, five primary ring circuits are indicated by the vertical row of boxes at 45, each circuit containing a different number of stages and the numbers of stages having no common denominator greater than 1. Each ring circuit generates an irregular series of two-valued pulses comprising marks and spaces; that is, in each cycle of the 240-kilocycle driving wave the output of any ring circuit may either contain a pulse or may be zero, the order varying in an irregular manner. These ring circuits are stepped in the manner to be described under control of the 240-kilocycle pulses supplied over a bus conductor 50.

The five outputs from the ring circuits 45 are sent into a permuter circuit 46 which distributes the pulses substantially evenly over the five output leads from the permuter. A second series of five electronic ring circuits is indicated by the vertical column of boxes 47. These ring circuits also contain different numbers of stages for producing irregular output current comprising pulses and blanks which are in each case sent through one of five leads into a corresponding gate circuit 48. The gate tube circuits 48 are operated under the joint control of the output current of the corresponding ring circuits 47 and the pulses received from one of the output conductors of the permuter 46 so as to distribute the pulses from the ring circuits 47 in irregular manner over the five output leads from the corresponding gate circuit 48. Means are provided in the five output leads of each gate 48 for assigning one of five different step values 1, 2, 3, 4 or 5 to the output pulse depending upon the lead in which the pulse appears. By this arrangement there is impressed on the reentry circuit 51 in each period of the 240-kilocycle wave during which stepping of the ring circuit occurs a maximum of five pulses from the respective gates 48. These pulses are summed and amount to a total which can vary between a minimum value of zero and a maximum value of twenty-five steps, the zero value occurring in case no gate is operated.

The reentry circuit 51 causes a pulse to be sent out on some one of the twelve output leads in each cycle of the 240-kilocycle wave when the rings are stepping and the particular output lead on which the pulse appears is determined by the step value of the summation current impressed upon the reentry circuit. By "reentry" is meant that the same output lead is energized by different step values of applied reentry current differing from one another by twelve steps. This means that the same output lead is energized when the summation current impressed on the reentry circuit has the value zero, twelve or twenty-four steps; that a different lead is energized when the summation current has the value one, thirteen or twenty-five steps; and another lead is energized when the value is either two or fourteen steps, etc.

The twelve output leads from the reentry 51 are carried through an interconnecting panel 52 which permits them to be cross-connected by hand in accordance with a prearranged program, such as once a day. The twelve output leads from panel 52 are used to control the stepping of twelve seven-stage rings indicated at 53. These rings are driven by the 240-kilocycle pulses but they are allowed to step only when a pulse is present in one of the twelve controlling leads from panel 52. Ring circuits 53 generate irregular series of output pulses since each stage contains in its output a switch for determining whether the output current will be a pulse or a blank. The outputs of the twelve ring circuits 53 are divided into two groups of six, the upper group of six passing into a permuter 54 and the lower group of six passing into a similar permuter 55. Each permuter is driven from the 240-kilocycle pulse source and continually redistributes the six input leads over the six output terminals. The twelve output terminals from the permuters 54 and 55 lead to twelve twelve-stage ring circuits indicated at 57, the stepping of each of which is jointly determined by the 240-kilocycle pulses and pulses received from permuter 54 or 55. Each twelve-stage ring circuit 57 has switches in the individual stage outputs for distributing the produced pulses in each case over twelve groups of individual weighting circuits indicated at 59.

These latter circuits include holding circuits for maintaining given pulse values constant for 18 milliseconds under control of 50-cycle pulses. These latter pulses are also supplied to the rings 57 to reset them to zero before each new stepping cycle. The final key pulses appear on the channel terminals 1 to 12.

Figure 3:
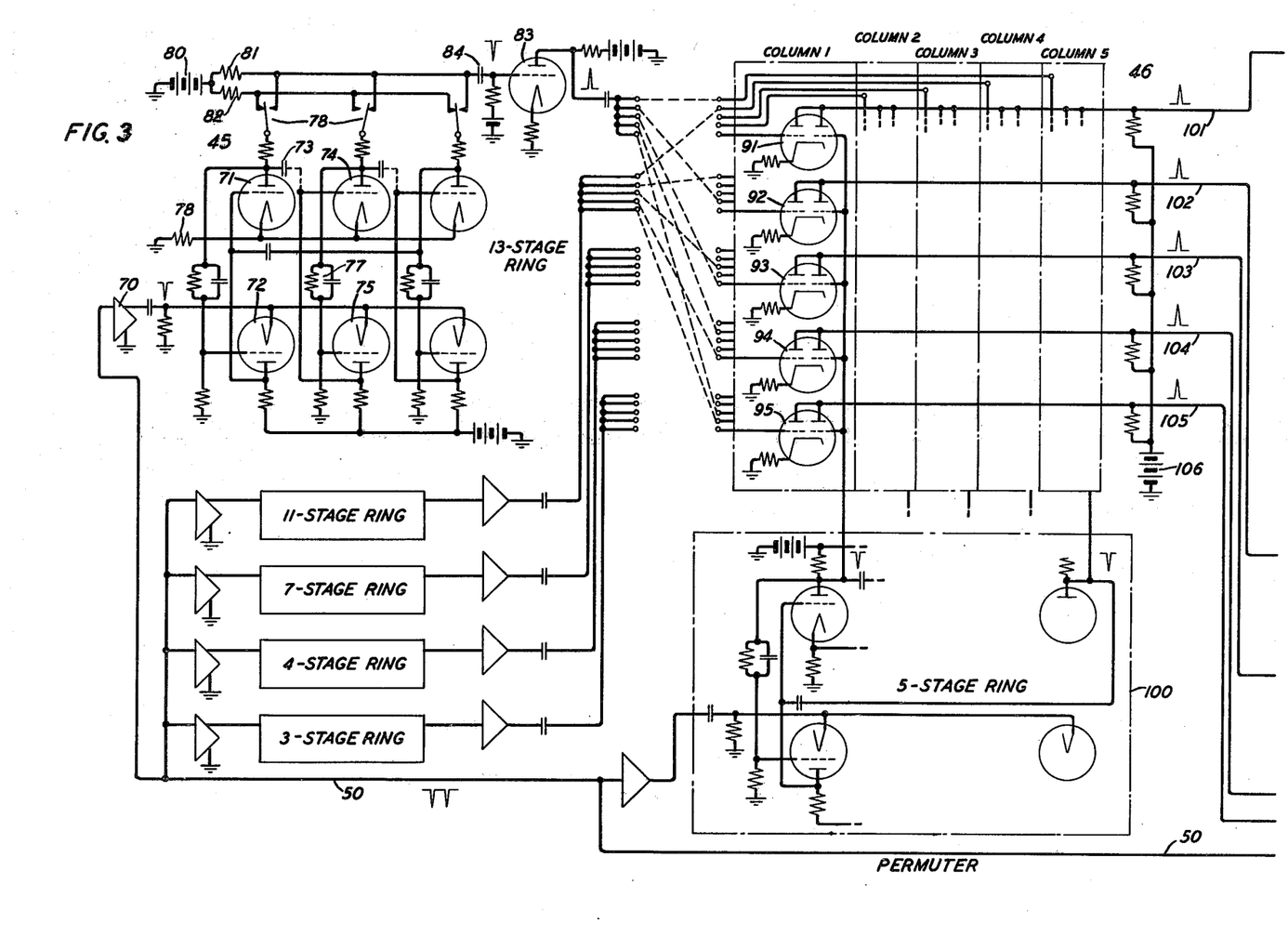
FIGS. 3 to 8, when placed together in the manner indicated in the key diagram of FIG. 9, show schematic circuit diagrams of a complete key generating system in accordance with the invention.

Referring to FIG. 3, the uppermost ring circuit 45 comprising thirteen stages is indicated in detail by showing the first and last stages and one intermediate stage. Each stage comprises a pair of upper and lower vacuum tubes, the lower tubes conducting as a group when their cathodes are driven negative by a pulse received from the 240-kilocycle bus 50 through the input amplifier 70, assumed to be a two-stage amplifier. The upper tubes conduct one at a time during the intervening times between pulses when the lower tubes are extinguished.

Assume that the ring circuit has been started and that, at the moment, tube 71 is conducting. The next 240-kilocycle negative pulse causes all of the lower tubes to conduct due to the application of the negative pulse to their cathodes. This so lowers the positive voltage applied to the grid of tube 71 from the plate of tube 72 that tube 71 becomes non-conducting. On account of the voltage drop in common cathode resistor 78 only a slight change in the grid voltage of tube 71 in the negative direction is required to cut this tube off. The cutting off of tube 71 sends its plate potential further positive and a positive pulse is transferred through condenser 73 to the grid of the upper tube of the next stage, such as tube 74. Since tube 71 is now cut off and no other tube in the upper row is conducting, the resistor 78 is without current so that tube 74 conducts in response to the positive pulse on its grid from condenser 73. When tube 74 conducts, it sends the grid voltage of tube 75 negative due to the coupling from plate of tube 74 to grid of tube 75 and the latter tube is cut off. Timing circuit 77 in this connection holds tube 75 cut off for the duration of the negative pulse of the driving voltage. Tube 75 when thus cut off applies positive voltage to the grid of tube 74 to hold the latter tube in conducting condition.

At the end of the negative pulse of the 240-kilocycle driving voltage, all tubes in the lower group except 75 are conducting, and as stated tube 75 in this condition holds tube 74 operated until the next negative pulse comes on. Upon the next swing to negative of the driving voltage all tubes in the lower row again conduct, tube 74 is cut off, and the next succeeding tube in the upper row is caused to conduct, the cycle repeating itself.

Figure 8:
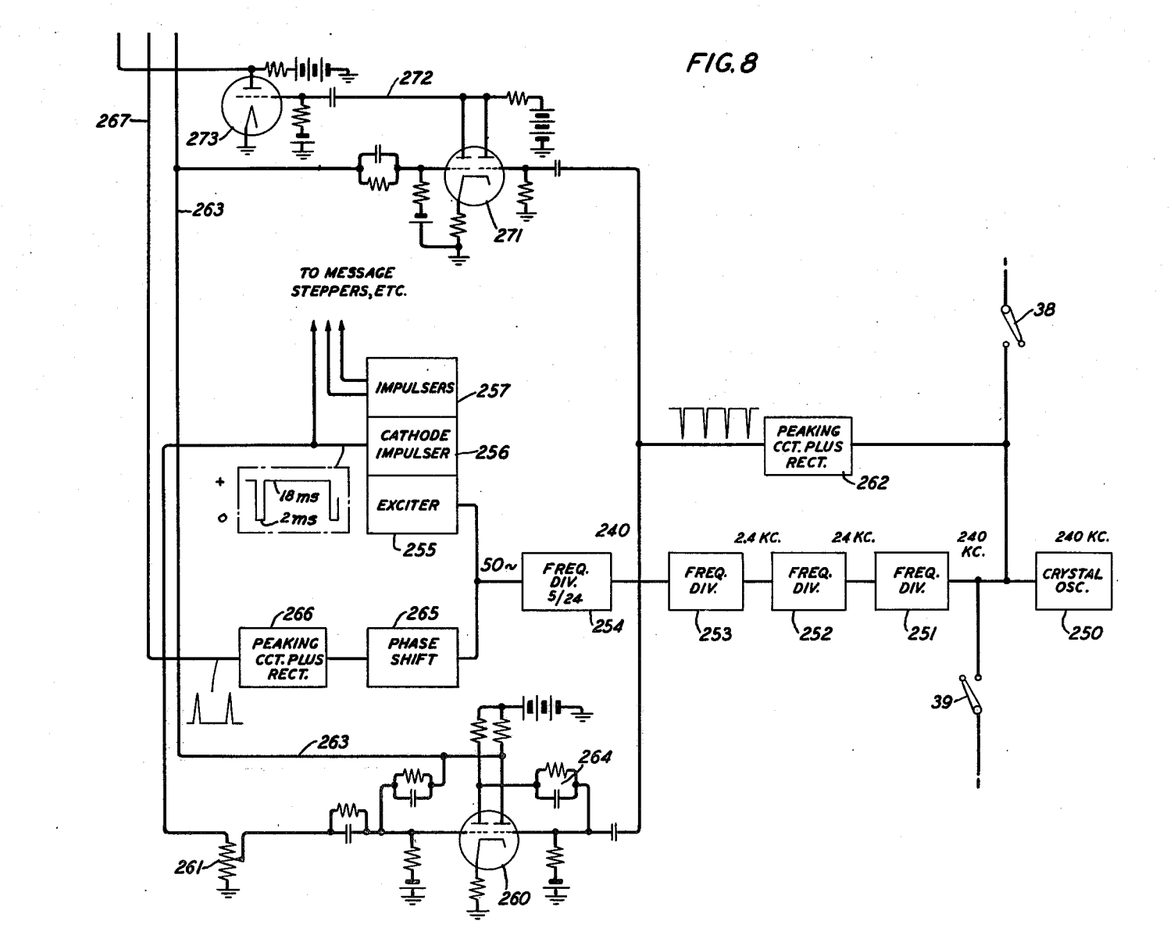

The manner in which the 240-kilocycle negative driving pulses are generated and supplied to bus 50 will be disclosed in detail in connection with FIG. 8.

Individual switches 78 enable the tubes of the upper group to receive their plate voltage from batteries 80 through either the series resistor 81 or 82. Only when the switches are thrown to include resistor 81 is a voltage impressed from the ring circuit upon the grid of the reversing tube 83 since resistor 82 is not connected to tube 83. (The convention comprising a V just after the coupling condenser 84 indicates that the pulse at this point is negative. The tube 83 reverses the sign of the pulse and the inverted V at the right of the tube 83 indicates that the pulse has now become positive. This convention will be used at various points to indicate the polarity of the pulses.) The switches 78 are used in each of the ring circuits in the group 45 for enabling each ring circuit to put out an irregular series of pulses and blanks. These switches form a part of the program circuit which may be changed at suitable times, such as once in twenty-four hours, in accordance with a prearranged schedule.

The permuter 46 is shown as comprising five columns of tubes arranged in five horizontal rows, the first column of tubes being indicated in detail as comprising the tubes 91 to 95. Each of these tubes is a duplex tube with two grids, one coming in from the left and the other from the right. All of the right-hand grids are connected in common to one of the stages of a five-stage ring circuit shown at 100. This is similar to the ring circuits 45 (except that it has no switches 78) and is driven under control of the 240-kilocycle source. Each stage of the ring circuit 100 connects to the permuter tubes in a different column so that the right-hand grids of the permuter tubes in successive columns are driven negative successively, column by column, at 240-kilocycle frequency. The positive pulses from each inverter tube 83 are distributed to the left grids of the permuter tubes in such manner that no single tube 83 is connected to two permuter tube grids in the same column or same horizontal row. The permuter circuit has five output leads shown at 101 to 105 each of which is connected to the plates of all of the permuter tubes in the same horizontal row. These output leads normally have output voltage applied to them from battery 106. This voltage remains unchanged unless at least one of the twenty-five permuter tubes is rendered non-conducting by application of a negative pulse to its right-hand grid when no positive pulse is present on its left-hand grid. No voltage change is produced in the leads 101 to 105, therefore, by the operation of the ring circuit 100 by itself, since application of negative pulses to the right-hand grids of the permuter tubes is not of itself sufficient to cut them off unless no positive pulse is being received at the same time from the reversing tubes 83. When, however, a reversing tube 83 produces no output pulse, the corresponding permuter tube 91, etc., is cut off by a negative pulse applied to its right-hand grid from the ring circuit 100. This results in the sending of a positive pulse into the corresponding lead 101 to 105. The permuter circuit, therefore, functions not, in effect, to pass on the positive pulses received from the tubes 83 but to distribute pulses in irregular order over the output leads 101 to 105 in response to absence of pulses in respective tubes 83. These distributed pulses appear in these leads as positive pulses and are applied to the right-hand grids of the gate tubes 48 shown on the next figure (FIG. 4).

The ring circuits 47 are similar to ring circuits 45 and function in similar manner except as to the manner of taking off the pulses in the output circuit. Individual multipoint switches are provided for each stage, two of these switches being shown in FIG. 4 at 110 and 111 and the others being similar. Each switch has six points which are connected to individual leads of the conductor group 107, these leads connecting at the left through series resistors to the battery 112 and connecting on the right through coupling condensers to the left grids of respective gate tubes 48. The left grids of these tubes are biased positive by batteries 113 and the pulse applied to the left grids from the ring circuits 47 are negative pulses.

In the case of the uppermost ring circuit 47 containing thirty-one stages, since these stages are distributed over only six output leads, several stages will normally be connected to the same lead. The positioning of the switches 110, 111 is, however, made irregular and is changed periodically, such as every day. Since one of the six leads in group 107 is not connected to any one of the gate tubes, a zero occurs on the average of one-sixth of the time in which no pulse is transmitted from the ring circuit to the gate tubes. The other ring circuits 47 and gate tubes 48 are similarly arranged.

Figure 4:
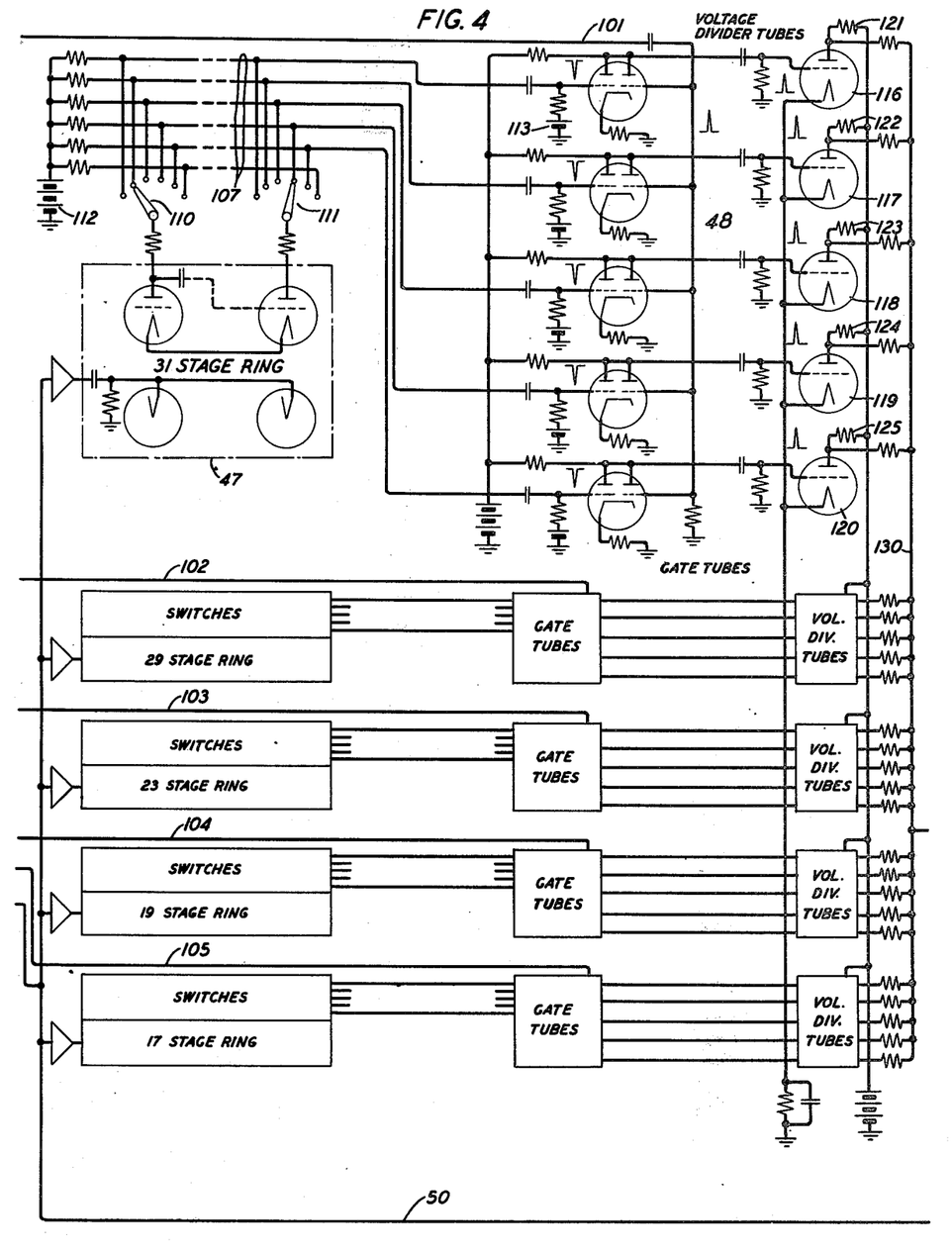
Figure 5:
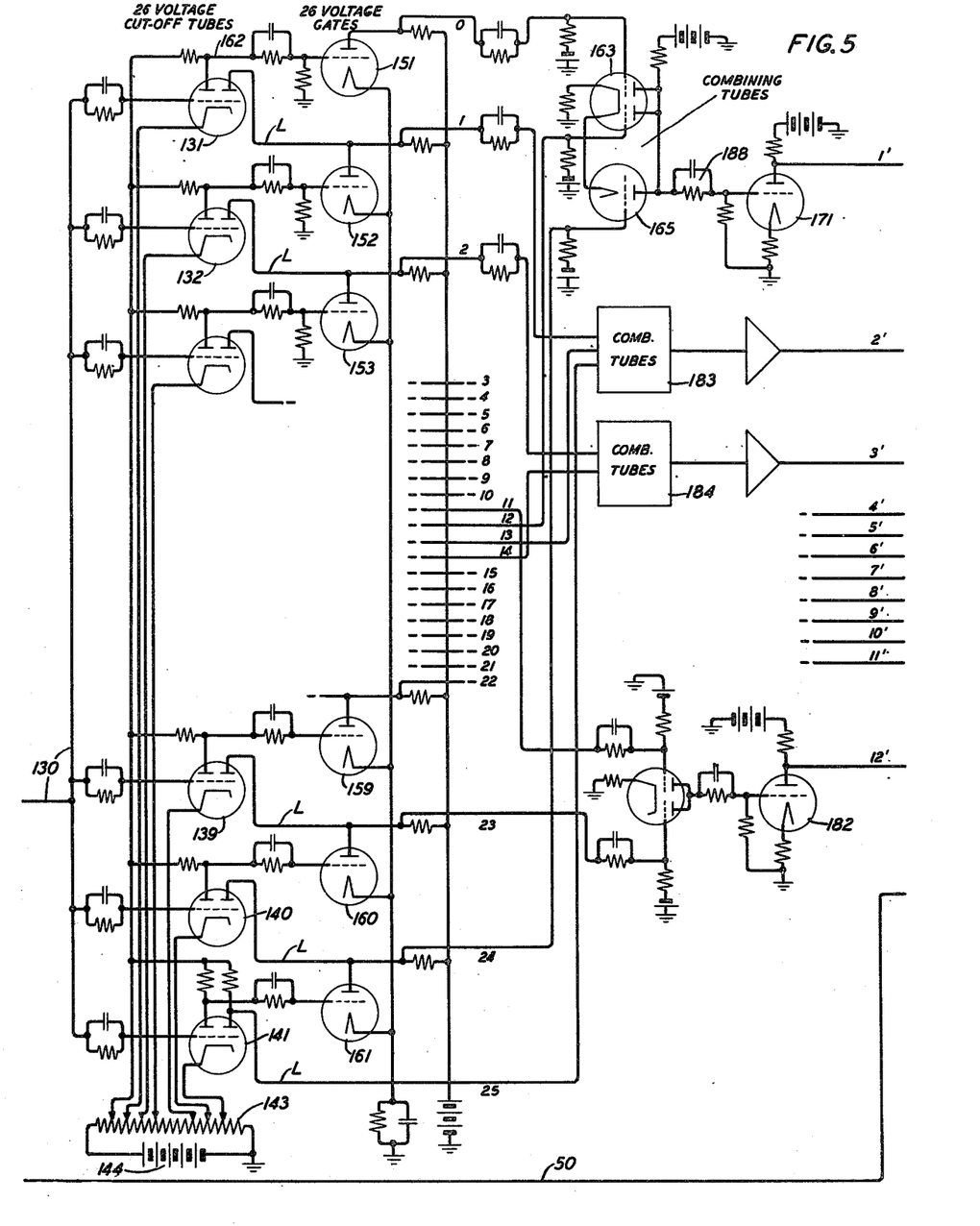

The apparatus within the box 51 of FIG. 2 labeled "reentry" comprises the circuits shown on FIG. 5 plus the voltage divider tubes shown in the vertical column in the right-hand portion of FIG. 4. There are five sets of voltage divider tubes with five tubes in each set, the upper set being shown at 116, 117, 118, 119 and 120. These tubes are normally cut off in the absence of applied positive pulses to their grids and the tubes in each group are made conducting one at a time under control of grid pulses.

Referring again to the gate tubes 48, these tubes are normally conducting current due to the positive bias on their left-hand grids. They, therefore, will send positive pulses into the voltage divider tubes only when the corresponding gate tube is cut off. These tubes are cut off whenever a negative pulse is impressed on their left-hand grid in the absence of a positive pulse on the right-hand grid over one of the conductors 101 to 105. Whenever such positive pulse is present on one of these five conductors, the corresponding gate tube cannot be cut off and no pulse is sent into the corresponding voltage divider tube.

The voltage divider tubes in each set contain weighting resistors in their plate circuits, these being shown, for example, at 121, 122, 123, 124, 125 and the values of these resistors are so chosen that when the corresponding voltage divider tube conducts, the drop in the voltage that is thereby produced in common conductor 130 varies in steps to give step values of 1 to 5, inclusive. It is obvious, therefore, that the maximum voltage exists on conductor 130 when all voltage divider tubes are cut off and that as one tube in each group conducts in varying order, the voltage on conductor 130 is reduced in value, the maximum possible decrease in voltage being twenty-five steps. This voltage is produced when the five voltage divider tubes, one in each group, conduct which have maximum value resistors in their plate circuits. To take an illustrative example, the minimum value of voltage of conductor 130 when such five voltage divider tubes are conducting may be 20 volts. This will result if each step value is 4 volts, and the maximum assumed value of the voltage of conductor 130 is 120 volts, since 20 volts plus 25×4 volts equals 120 volts.

In FIG. 5 the conductor 130 is shown as multipled to the left-hand grids of twenty-six voltage cut-off tubes shown in a vertical column on the left side of the figure, the uppermost of these tubes being shown at 131 and the lowermost tube at 141. Each of these tubes is a tube having a single grid with two plates. The left-hand plate of each tube is connected through a series resistor to the positive terminal of battery 144 while the cathode of each tube is connected to an individual point on potentiometer resistance 143 connected across the battery 144 so that the cathode voltage of these tubes varies in steps from tube to tube, the cathode of tube 141 having the lowest voltage relative to ground and the cathode of tube 131 having the highest voltage. When the minimum value of voltage, for example 20 volts, is present on conductor 130, none of the tubes 131 to 141 conducts. If the voltage on conductor 130 rises one step in value to 24 volts, tube 141 conducts; if this voltage rises two steps in value, tubes 141 and 140 conduct, while for the maximum voltage of 120 volts, all tubes 131 to 141 conduct.

Connected to the right-hand plate of each of the tubes 131 to 141 is an individual L-conductor the opposite terminal of which connects to the plate of the next lower level gate tube 151 to 161, of which there are twenty-six such tubes, except in the case of the voltage cut-off tube 141 whose L-conductor extends to the right and becomes lead 25. There are twenty-six of these leads extending to the right and numbered on the figure 0 to 25, inclusive. The purpose of these leads will be described later but it may be stated here that a positive impulse is applied to only one of these twenty-six leads at any one time from the corresponding L-conductor.

Assuming, for example, that voltage on lead 130 has its maximum value corresponding to the condition that all of the voltage divider tubes of FIG. 4 are cut off, all of the twenty-six voltage cut-off tubes 131 to 141 are conducting and through their right-hand anodes are placing a low voltage on the left end of each of the L-conductors. There is also a low voltage placed on conductor 162 extending from the left anode of tube 131 to the grid of the uppermost gate 151 causing tube 151 to be cut off. For a similar reason each of the other voltage gates 152 to 161 is also cut off. A high voltage, therefore, exists on the zero lead extending from the plate of tube 151 to the first grid of the duplex tube 163. All of the other output conductors 1 to 26 have a low voltage on them due to the fact that the left end of each L-conductor is at low voltage so that notwithstanding the high voltage existing on the right end of the L-conductor, (the plate of the corresponding tube 152, 153, etc.) the voltage applied to the output lead is low. It is seen, therefore, that when none of the voltage divider tubes of FIG. 4 is conducting, a high positive voltage exists on the zero output lead in FIG. 5 and on this lead only.

If one voltage divider tube of FIG. 4 conducts, such as 120, and reduces the voltage on conductor 130 by one step, the upper cut-off tube 131 is cut off since its grid voltage is reduced sufficiently below its cathode voltage to prevent current flow. This raises the potential on both plates of the tube 131. The voltage on the left-hand plate causes gate tube 151 to conduct and place a low voltage on the zero output lead. The right-hand plate of tube 131 makes the left-hand end of the corresponding L-conductor highly positive and since at this time tube 152 is cut off, the right-hand end of this L-conductor is also at high positive potential and a high voltage condition is placed on output conductor 1.

If the voltage on conductor 130 is lowered by two steps, the two cut-off tubes 131 and 132 are both cut off. This causes gate tubes 151 and 152 to conduct, placing a low voltage condition on output conductors 0 and 1. The right-hand plate of tube 132 places a high voltage on the left end of the corresponding L-conductor and since tube 153 is at this time cut off, a high voltage also exists on the right-hand end of this L-conductor causing a high positive voltage condition to exist on output lead 2. In similar manner for each step value of voltage applied to the conductor 130 there is a high positive voltage condition on some one and one only of the twenty-six output leads shown at 0 to 25.

At the extreme right of FIG. 5 twelve conductors numbered 1' to 12' are shown extending toward the right. These twelve conductors are each connected to the plate of a corresponding triode shown at 171 to 182. These tubes are normally conducting. These tubes are arranged to be cut off one at a time when the high voltage condition exists on some one of the 0 to 25 conductors. For this purpose combining gate circuits are used, one such circuit comprising the duplex tube 163 together with the triode 165. Both of these tubes 163 and 165 are normally cut off but when either of the two grids of tube 163 or the grid of tube 165 has impressed upon it the high voltage condition existing on the corresponding lead-in conductor group 0 to 25, the tube conducts and applies a negative pulse to the grid of tube 171 causing that tube to cut off and send a positive pulse into conductor 1'. It will be noted that the two grids of tube 163 are connected respectively to lead 0 and lead 12, while the grid of tube 165 is connected to lead 24. A high positive voltage on any one of these three leads 0, 12 or 24, therefore, produces the same effect, namely, a positive pulse in conductor 1'. Similarly, referring to the combining tube circuit 183, it will be seen that a high positive voltage existing on any one of the leads 1, 13 or 25 will send a positive pulse into conductor 2'. Considering combining tube circuit 184, a high positive voltage on either conductor 2 or 14 will send a positive pulse into conductor 3'. For all of the combining tube circuits except the one shown at the top of the figure and that indicated at 183, only a duplex tube, such as 163, is required, since only two of the output conductors lead into such a combining tube circuit. A combining tube circuit for the leads 11 and 23 is shown in detail at the bottom adjacent tube 182 by way of example.

The reason for calling this circuit a reentry circuit is that each of the conductors 1' to 12' is similarly affected by an actuating voltage on any one of a group of the 0 to 25 conductors which are separated by eleven intervening conductors. That is, if an actuating voltage is put successively on output leads 0 to 11, inclusive, a positive pulse is sent to conductors 1' to 12' in succession; then, if an actuating voltage is put successively on output conductors 12 to 23, inclusive, a positive pulse is likewise sent into each of output conductors 1' to 12' in succession and so on.

The conductors 1' to 12' are carried through a cross-connecting frame 190 which permits them to be interchanged with the twelve output terminals on this panel from time to time, such as once a day, in accordance with a prearranged program. Each of these conductors upon emerging from panel 190 is connected through a coupling condenser to the left grid of a break gate 191 to 202. The positive pulses are in this way applied to the left-hand grids of these tubes one at a time and as indicated the pulse is flat-topped so that it exists for a longer time than the short sharp negative pulses that are shown applied to the right-hand grids of these tubes from the driving source (240 kilocycles). This elongation of the positive pulses is produced by the condenser resistance timing circuit shown in the grid circuit of each of the tubes 171 to 182 at 188, for example, in the case of tube 171.

Figure 6:
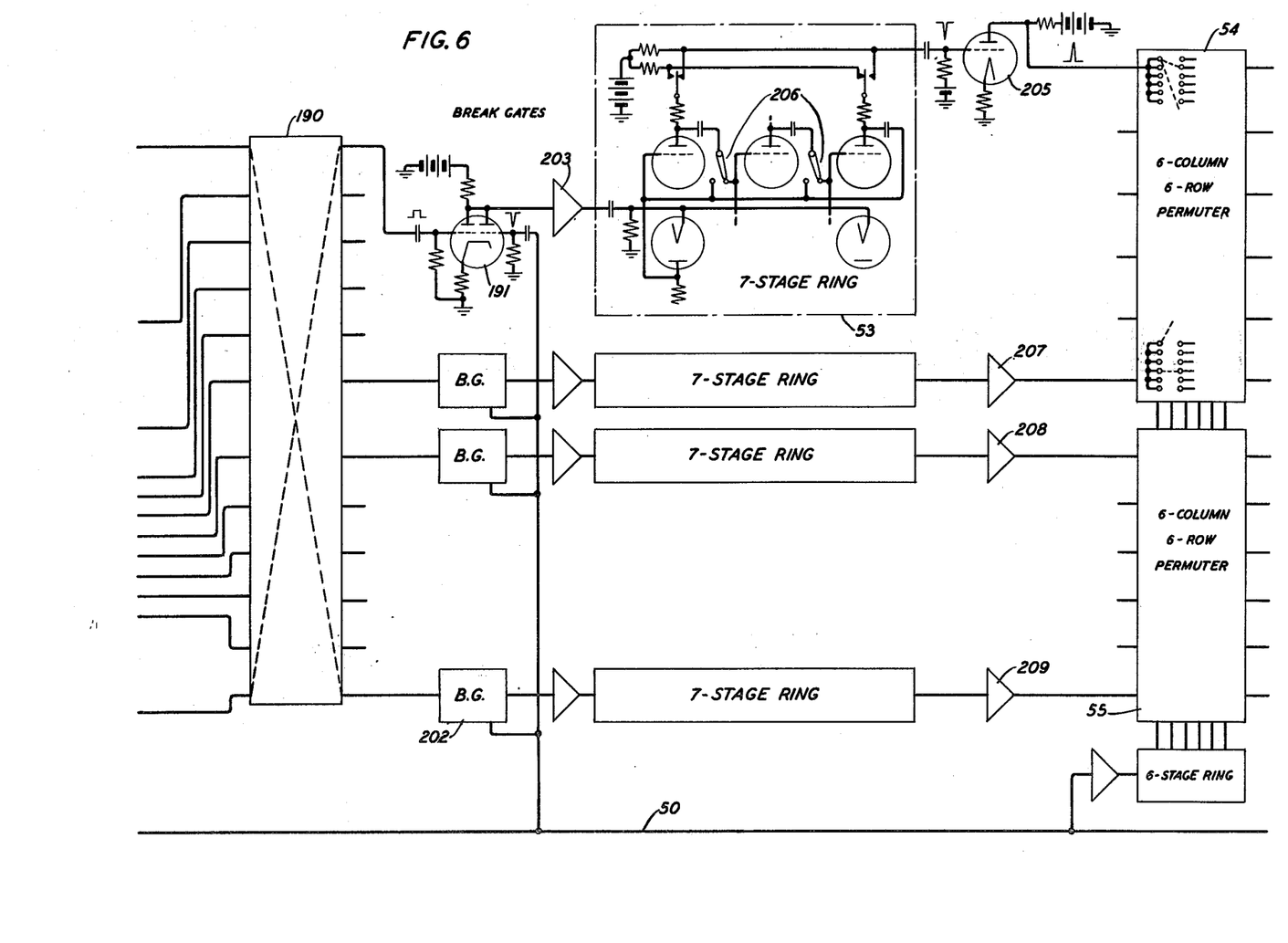

The break gates 191 are normally conducting but are arranged to be cut off by the negative pulse applied to the right-hand grid from the driving source unless a positive pulse is received from the reentry circuit on the left grid. When these tubes are thus cut off, a positive pulse is sent into the reversing amplifier 203, resulting in a negative pulse being applied to the cathodes of the lower group of tubes of the corresponding seven-stage ring circuit 53, causing the corresponding ring circuit (unless prevented) to step at the rate of 240,000 steps per second. When a positive pulse is received from the reentry, however, on the left grid of one of the break gates, such as 191, the negative pulse from the driving source is unable to cut off tube 191 and the corresponding ring circuit 53 fails to step.

These ring circuits 53 operate in the same manner as the ring circuits 45, except for their irregular stepping, and individual switches in the plate circuits of the upper row of tubes may be thrown either to the right or to the left as in the case of switches 78 of FIG. 3 to determine whether or not a pulse is to be impressed from the corresponding stepper tube upon the grid of the amplifying and reversing tube 205 associated with the respective ring circuit. A further difference exists between the ring circuits 53 and the previously described ring circuits 45 in that the number of stages in the ring circuits 53 may be varied from time to time by throwing a corresponding switch 206 from its normal right-hand position to its left-hand position to reduce the number of stages in the ring from seven to some lower number. These switches 206 constitute a part of the program changing equipment. The first and sixth reversing tube for the upper group of six ring circuits 53 are shown at 205 and 207, while the first and sixth reversing tubes for the lower group of six ring circuits 53 are indicated at 208 and 209, the intervening reversing tubes in each group being omitted from the drawing for simplicity.

The upper group of reversing tubes 205 to 207 which are normally conducting but which are cut off at irregular times under control of the ring circuits 53 are connected to permuter 54 and send positive pulses into this permuter. Similarly, the six tubes 208 to 209 send positive pulses in irregular sequence into the permuter 55. Each of these permuters is constructed similarly to the permuter 46 except that these two permuters 54 and 55 each contain six columns and six rows of permuter tubes. The six multiple terminals of any one tube, such as 205, are variously connected to the permuter tubes following the same law as explained in connection with permuter 46 and these connections can be changed periodically, such as daily, to vary the scheme of connection. As a result of the operation of these permuters, the pulses controlled from the tubes 205 to 209 are variously distributed over each group of six output conductors leading to the upper six break gates 210 to 211 and to the lower group of break gates 212 to 213, respectively, of FIG. 7.

Figure 7:
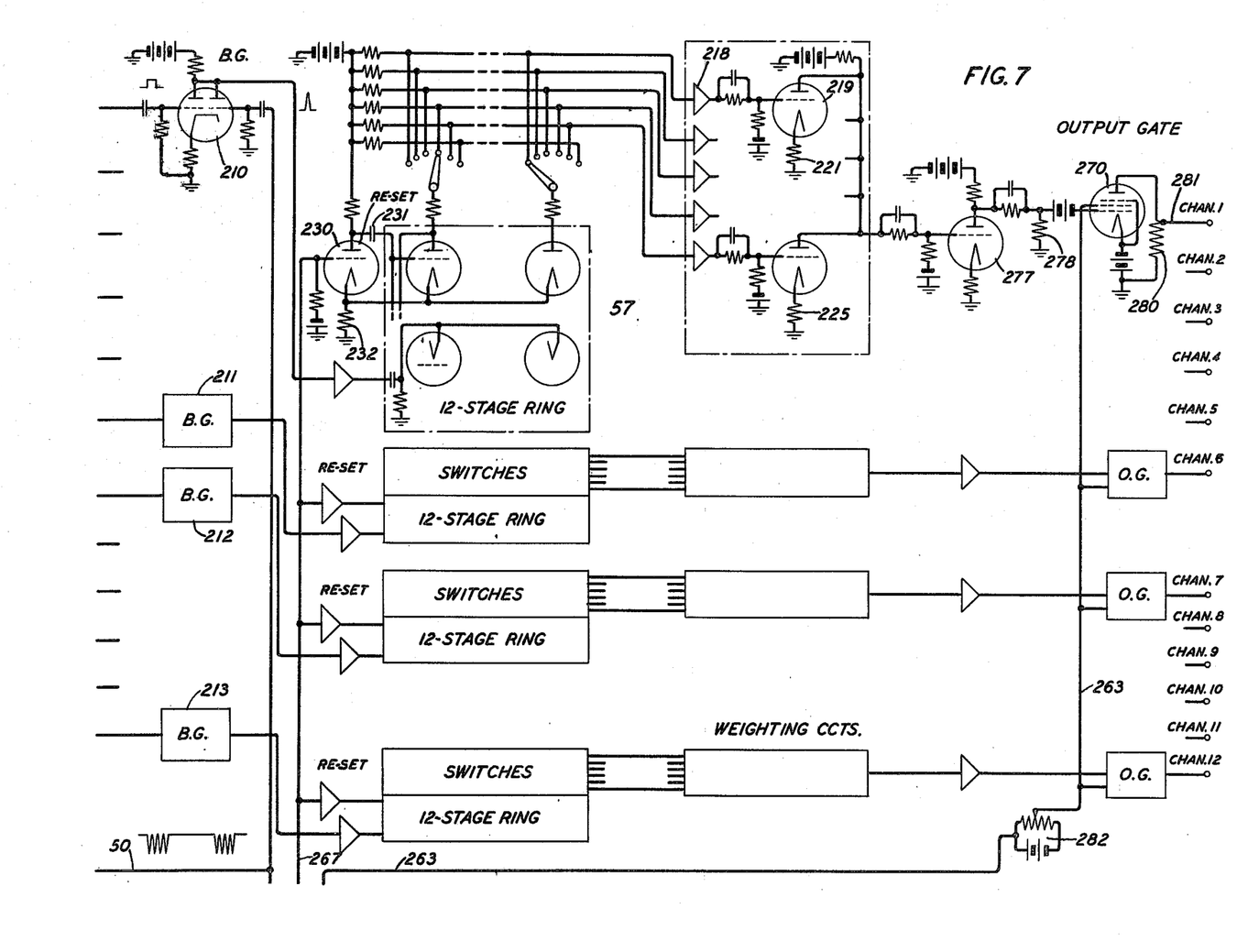

The break gate tubes 210 to 213 operate similarly to the break gate tubes 191 to 202 and determine whether the 240-kilocycle driving pulses are to be passed on to the rings of 12 shown at 57 to cause these rings to take a step or, alternatively, whether the driving pulse is in any case to be suppressed by presence on the left grid of a positive pulse received as described from permuter 54 or 55. If such a positive pulse is present on the left grid of a break gate, the corresponding ring circuit in group 57 is deprived of a driving pulse and is not stepped.

These rings of 12 are similar to rings 47 in that they are provided with similar selector switches for connecting the individual stages in varying order to six points of which five are connected to the grids of individual amplifiers 218 followed by weighting circuits 219 comprising tubes having output control resistors 221 to 225 connected between their cathodes and ground and graduated in size to cause the output voltage to vary in steps from tube to tube, the steps having the values 1, 2, 3, 4 and 5 according to which tube is operated and 0 if no tube is operated. Since only one stage of a ring 57 is conducting at a time, one or none of the weighting tubes 221 to 225 is operated at a time. The rings 57 each determine, therefore, a particular output key value for each step of the ring and this relation can be varied by changing the switch settings for the several rings in accordance with a program.

Up to this point in the description no assumption has been made of any interruptions in the 240-kilocycle pulse supply for stepping the various ring circuits. In fact the rings up to and including the rings 47 may be stepped continuously if desired and the rings of 12 in group 57 could also be stepped continuously except for a re-set feature associated with these rings. A disadvantage of allowing the rings to step continuously is that in so doing they would use up available length of cycle at a needlessly high rate since, as stated initially, the final key pulses are assumed to persist for 18 milliseconds with 2 milliseconds spacing between key pulses. The rings would, then, be stepping for 18 milliseconds between the beginning and end of each key pulse without any useful purpose since the 2-millisecond interval is long enough to allow the rings to step for cryptographic purposes. In the present disclosure, therefore, means are provided as will be described in connection with FIG. 8 for interrupting the supply of the 240-kilocycle pulses to all of the ring circuits for 18 milliseconds out of each 20-millisecond period and for supplying these pulses for only the 2-millisecond time interval. This will allow the rings to step a maximum of 480 steps in one stepping interval except the rings in groups 53 and 57 which skip an indefinite number of steps.

The rings of 12 (group 57) include a re-set feature according to which each ring always starts to step from its first stage rather than beginning with the next stage following its last preceding step. Tube 230 is provided for this purpose having its plate coupled through a condenser 231 with the grid of the upper tube of ring stage 1. The grid of tube 230 is pulsed positively once every 20 milliseconds immediately before a new 2-millisecond stepping period begins. This causes tube 230 to conduct and due to current in the common cathode return resistor 232 prevents any upper tube of the ring from conducting. When the pulse ends, a positive voltage is transferred through condenser 231 to the grid of the upper tube of the first stage of the ring circuit so that on the first subsequent 240-kilocycle negative pulse the ring starts stepping beginnning with stage 1. This is true, of course, of all of the rings 57. At the beginning of each 2-millisecond stepping interval all of these rings of 12 start stepping in irregular manner under control of the break gate tubes 210 to 213 and in this stepping interval they have time to make several complete revolutions. At the end of such stepping interval each ring is stopped and due to the method of control the particular stage that is left energized when the ring is stopped is to a high degree fortuitous. The stage so energized remains energized for 18 milliseconds until the beginning of the next stepping interval, when the rings are again stepped beginning with stage 1. If these rings were stepped continuously by an uninterrupted supply of 240-kilocycle pulses, it would be necessary to use a holding circuit such as a key stepper to maintan the key pulse for an 18-millisecond period.

Reference will now be made to the circuits for generating the pulses required for actuating the system, as shown on FIG. 8. These pulses are derived from primary oscillator 250 which may be a crystal controlled vacuum tube oscillator of highly constant frequency, of known type, generating a 240,000-cycle frequency sine wave. Some of the output from this oscillator is led directly to terminal of switch 38 (see FIG. 1) for transmission to the distant station, this switch being supplied only at the station at which the oscillator 250 is located. At the other station switch 39 is closed if the oscillator 250 is absent. Alternatively, independent oscillators may be used in which case no connections through switches 38 and 39 are needed, the oscillators running in sufficiently close synchronism. Following the oscillator 250, or the point at which it is shown connected, are frequency dividing circuits 251, 252, 253 and 254 in tandem, each of which except the last divides the input frequency by a factor of 10, and the last in the ratio of 5/24 to give a final frequency of 50 cycles per second. Each of these dividing circuits may be of known type such as shown, for example, in U.S. Pat. No. to R. L. Miller 2,159,595, granted May 23, 1939.

This 50-cycle wave would replace the 50-cycle oscillator shown in the Lundstrom-Schimpf disclosure in case the key generating system of this application is used to supply key pulses as assumed in FIG. 1 to a system of the type disclosed by Lundstrom and Schimpf. Therefore this 50-cycle wave is shown feeding exciter 255 which in turn feeds a cathode impulser 256 and other impulsers 257 all of which are assumed the same as corresponding elements in the Lundstrom and Schimpf disclosure as particularly shown in FIG. 4 of their application. Leads are shown extending from these impulsers for connection to the message steppers and other equipment of that application. The key steppers of that application may be omitted when the key generator of the present application is used.

The output of the cathode impulser consists of direct current positive pulses of 18 milliseconds length separated by 2-millisecond spaces. These are led through a potential reducing potentiometer 261 to the left grid of a flip-flop tube 260 the right-hand grid of which is supplied with 240-kilocycle negative pulses obtained from the peaking circuit 262 which may be of known type such, for example, as shown in Wrathal U.S. Pat. No. 2,117,752, granted May 17, 1938. It is assumed in this case that only the short sharp negative pulses are used, the positive pulses being suppressed.

During the 18-millisecond pulses the left-hand side of tube 260 is conducting while the right-hand side is cut off and high voltage is applied therefore to conductor 263 for this 18-millisecond period. At the end of the pulse received on the left grid from 261, the left-hand side of tube 260 is cut off driving the right-hand grid positive via coupling path 264. The right-hand side does not become conducting, however, when one of the negative pulses is being received from 262. Only during the interval between two of these pulses can the right-hand side of the tube shift from non-conducting over to conducting condition. When this occurs the high voltage condition on conductor 263 ends and a zero voltage condition begins. After 2 milliseconds the left side of tube 260 conducts but the right side does not become cut off until a negative pulse is present on the right grid from 262. In this way the beginnings and ends of the 18-millisecond pulses on lead 263 are accurately determined by the aid of the 240-kilocycle pulses.

The re-set pulses are generated in the branch comprising phase shifter 265 and peaking circuit 266 which may be similar to circuit 262. A sharp pulse is produced every one-fiftieth of a second and the time position of this pulse with respect to the other pulses can be readily varied by adjusting phase shifter 265. These sharp pulses are supplied over conductor 267 to the re-set tubes 230.

The square pulses in conductor 263 are used for two purposes: to interrupt the supply of 240-kilocycle driving pulses to the various ring circuits over a bus conductor 50; and to gate the final output key pulses at the output tubes 270 for each channel. The interrupting of the supply pulses occurs in tube 271 the right-hand grid of which is supplied continuously with 240-kilocycle pulses from circuit 262. The output conductor 272 is unaffected by these pulses so long as the 18-millisecond positive pulses are on the left-hand grid. During the 2-millisecond intervals between pulses the left grid goes so far negative that this side of the tube becomes ineffective and the negative pulses are repeated into output conductor 272 leading to phase reversing tube 273 the output of which supplies the 2-millisecond spurts or trains of negative pulses to bus conductor 50.

Lead 263 also connects to the screen grid of each output gating pentode 270 the output of which supplies the final key pulses. The 18-millisecond positive pulses in lead 263 act as pedestal pulses to overcome the normal bias-beyond-cut-off applied to the screen grids so that the tubes 270 can be changed from non-conducting to conducting condition by output voltage received from phase reversing tubes 277. During any 18-millisecond pulse, therefore, voltage of a certain step value from the weighting tubes 219 is impressed on the grid of tube 277 and the higher the step value the more negative is the voltage so impressed. These negatively stepped voltages appear as positive pulses across output resistor 278 and are impressed upon the control grid of output stage 270. It is desired to have the final output key pulses vary from zero, corresponding to step zero, to negative values increasing in steps according to the step value so that these key pulses may be impressed upon the reentry circuit (of the Lundstrom-Schimpf disclosure) along with the output pulses from the message steppers which are zero for step zero and increasingly negative for increasing step values. The tube 270 is non-conducting during each 2-millisecond space so that output coupling resistor 280 is without current and conductor 281 is at ground potential. This is also the condition for step zero. As the grid is driven further positive for each step value, however, increasingly negative voltages appear on lead 281. It will be understood that the negative bias applied to lead 263 from battery and potentiometer 282 is such as to completely cut off current in output gating tubes 270 but that the positive 18-millisecond pulses received from tube 260 neutralize this negative bias so that the output current in resistor 280 is proportional to the step value of the key pulses on the control grid of tube 270. In this way a separate key is generated on each of the twelve output channel terminals.

What is claimed is:

1. A key generating system for generating pulses at a given frequency having a highly irregular distribution of pulse amplitudes comprising means for generating separate series of irregularly occurring pulses in separate circuits at a frequency which is of higher order than said given frequency, means for variously combining said latter pulses and distributing the combined pulses among a plurality of paths to produce a high degree of irregularity in the occurrence of the pulses in each of said paths, and means selecting for eventual use only those pulses in a given path which occur at periodic instants of time corresponding to said given frequency, while discarding the intervening pulses.

2. In a key generating system for producing key pulses of definite duration and varying in magnitude in fortuitous manner, cyclically operating means for generating initial pulses in irregular sequences, means for irregularly modifying the pulses put out by said cyclically operating means to increase the total cycle of the system, said cyclically operating means producing pulses at a rate many times faster than the rate of the key pulses, means for sampling the irregularly modified pulses at the beginning of each key pulse interval to determine the magnitude of the modified pulse, and means to hold the magnitude of the sampled pulse for the duration of a key pulse to convert the sampled pulse into a key pulse.

3. In a system for generating relatively slow-speed key pulses varying in magnitude in fortuitous manner, high speed pulse generating means for generating highly irregular pulse sequences, means to sample said pulses at a slow rate to select a single one of said pulses at a time, and means to prolong the selected pulse for the duration of the required key pulse.

4. A system according to claim 3 in which said sampling mean includes cyclically operating elements and means for disturbing the periodicity of said cyclically operating elements.

5. A system according to claim 3 including means to limit said irregular pulse sequences to the duration of the inter-pulse spaces of said key pulses.

6. In a key pulse system for generating key pulses of definite length and highly irregular magnitude with intervening spaces, cyclically operating devices for generating groups of irregular sequences of pulses at a rate much higher than the rate of occurrence of said key pulses, each such group of pulses existing for the length of one of said spaces, and means to determine the magnitude of the next key pulse from the last pulse in the group of pulses occupying the preceding space.

7. In a key pulse generating system, an initial set of cyclically operating devices for generating irregular sequences of pulses, including means to modify the output pulses in varied manner to lengthen the effective total cycle, a subsequent set of cyclically operating devices for producing irregular pulse sequences from which the final key pulses are derived, means to modify the pulse sequences produced by said subsequent set of devices by the pulses produced by said initial set of devices and means to conceal the cyclic character of said first set of devices comprising a pulse adding circuit and a reentry circuit interposed between said first and said second sets of devices.

8. A system according to claim 7 in which said first set of devices is provided with a plurality of weighting circuits each delivering a different magnitude of output pulse, means to distribute pulses from certain of said devices to certain of said weighting circuits in varied order, and means to impress the outputs of said weighting circuits upon said adding circuit.

9. A key generating system for generating a plurality of independent keys, comprising a separate output-terminal for each key, each key consisting of pulses of current of definite length and irregularly stepped magnitude, said system including a plurality of prime pulse producers common to all of said terminals for producing independent series of irregularly occurring marks and spaces, said marks and spaces occurring at a much higher frequency than said key pulses, means for irregularly distributing said marks and spaces over intermediate terminals, means for producing irregular series of marks and spaces in individual paths, means controlled in common by the marks and spaces on said intermediate terminals for variously modifying the marks and spaces in said individual paths, means for variously distributing the modified marks and spaces in said individual paths over connections individual to said output terminals including means for weighting the pulses appearing on each such connection, means to select and impress on each output terminal at the beginning of each key pulse period the weighted pulse on the corresponding connection and means for maintaining the magnitude of the selected and impressed pulse constant throughout the key pulse period.

10. A key generating system according to claim 9 including between said intermediate terminals and said individual paths means for adding the pulse values occurring on said terminals in each high frequency pulse period to form summation pulses, and means for reentering said pulse summation values at a reentry value corresponding to the total number of said individual paths, whereby the path in which a pulse is modified is determined in each high frequency pulse period from said reentering means.

11. In a system employing pulses varying in magnitude from one pulse to the next, means for adding pulse values in a summation circuit to provide summation pulses having a given range of values, an individual output conductor for each pulse value and means to energize a different one of said conductors in response to each different pulse value in said summation circuit comprising marginally responsive devices for receiving said summation pulses, each device having an increased operate margin over the next such that each increase in pulse value causes operation of another device, a set of other devices individually operated from corresponding unoperated marginally responsive devices, and means for impressing on said individual output conductors a voltage determined by one of said marginally responsive devices and the other device whose operation is controlled by the marginally responsive device having the next lower operate margin.

12. In a system employing pulses varying in magnitude from one pulse to the next, means for adding pulse values in a summation circuit to provide summation pulses having a given range of values, an individual output conductor for each pulse value and means to energize a different one of said conductors in response to each different pulse value in said summation circuit comprising a succession of pairs of devices each device having an operated and an unoperated condition, the second device of each pair being unoperated or operated from the first device of said pair in response respectively to the operated or unoperated condition of such first device, said first devices having marginally operating characteristics such as to cause them to operate in succession in response to increasing values of said summation pulses, each output conductor being connected in common to a first device and to the second device of the next pair in the succession, all operated devices impressing low voltage upon the individual output conductors and all unoperated devices impressing high voltage upon the individual output conductors.

13. A circuit for distinguishing between voltages varying in steps comprising an individual output conductor to be energized in response to each voltage step value, a succession of pairs of responsive devices each when unoperated having a high output voltage and when operated having a low output voltage, the first devices of said pairs having graduated response characteristics corresponding to said step values, means causing the first device of each pair in operating or releasing to release or operate the second device of the same pair, means to impress said voltage steps on the first devices of all of said pairs to cause one or more of said first devices to operate in accordance with the step value of the impressed voltage, and connections from each of a plurality of said output conductors to the first device of a respective pair and to the second device of the adjacent pair the first device of which responds to the next step value, for impressing low voltage on all of said output conductors except that one which is connected to an unoperated first device of a pair and the unoperated second device of the adjacent pair, said one conductor receiving high voltage from said last two devices.

14. The circuit claimed in claim 13 in which each of said devices comprises a grid-controlled space discharge device having an anode, said output conductors being connected to the anodes of respective devices, as aforesaid.

15. A voltage discriminating circuit for discriminating between N discrete voltage values where N is greater than 2, comprising a first succession of N response devices, a second succession of N response devices, means energizing the first devices in stepped order in accordance with the steps of voltage whose values are to be indicated, means to energize the second devices individually from the first devices in response to deenergization of said first devices, said circuits causing N—n of said second devices to be operated whenever n of said first devices are operated, and a total of N output conductors individually connected to receive a voltage jointly from one of said first devices and from that one of said second devices which is energized from the first device responding to the next lower step of voltage.

16. A voltage discriminating circuit for discriminating between input voltage steps comprising a first group of voltage responsive devices each having a different threshold value of response voltage corresponding to the successive steps of said input voltage, a second group of responsive devices individually energized from said first devices, each of said second devices being energized or deenergized depending upon whether the respective first device is deenergized or energized, a plurality of output conductors for individually responding to the impressed voltage steps, said conductors being connected individually to receive a low or high voltage from one of said first devices according as the latter is energized or deenergized and to receive a low or high voltage from that one of said second devices that is energized from the first device having the next lower threshold value of response voltage, whereby only one of said output conductors at a time receives high voltage from one of said first and also from one of said second devices.

17. An electronic permuter circuit having columns and rows of electron tubes, a timing circuit for conditioning said tubes for response column by column, an output conductor per row of tubes connected to the anodes of all tubes in the same row, a corresponding number of input conductors each multiply connected to a grid element of one tube in each row, the same input conductor not being connected to grids of any two tubes in the same row, and means to apply voltage to said input conductors individually, each tube responding to such applied voltage only when the timing circuit is conditioning the tubes in the column in which such tube appears.

18. In a key generating system for delivering output key pulses at a given frequency and varying in amplitude in fortuitous manner with time, a plurality of means to generate cycles of pulses at a much higher frequency than said given frequency, means to combine said cycles to lengthen the total cycle of pulse generation, means for irregularly distributing said pulses over a plurality of circuit terminals, means to select pulses from among said terminals in irregular order, means to discard all of said pulses except those pulses which occur at said given frequency, means to select said last named pulses and means to predetermine the amplitude of the selected pulses.

* * * * *